(12) United States Patent
Katsuno et al.

(10) Patent No.: US 10,369,803 B2
(45) Date of Patent: Aug. 6, 2019

(54) INKJET PRINTER AND INKJET PRINTING METHOD

(71) Applicant: Roland DG Corporation, Hamamatsu-shi, Shizuoka (JP)

(72) Inventors: Yukinori Katsuno, Hamamatsu (JP); Koji Takahashi, Hamamatsu (JP); Keiko Oishi, Hamamatsu (JP); Takeshi Yagi, Hamamatsu (JP); Satoshi Saito, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 16 days.

(21) Appl. No.: 15/801,328

(22) Filed: Nov. 2, 2017

(65) Prior Publication Data
US 2018/0126747 A1    May 10, 2018

(30) Foreign Application Priority Data
Nov. 4, 2016    (JP) .................................. 2016-216180

(51) Int. Cl.
*B41J 2/21*     (2006.01)
*B41J 11/00*    (2006.01)
*B41J 2/045*    (2006.01)

(52) U.S. Cl.
CPC ............ *B41J 2/2114* (2013.01); *B41J 2/2117* (2013.01); *B41J 11/002* (2013.01); *B41J 2/04531* (2013.01)

(58) Field of Classification Search
CPC ............................. B41J 2/2114; B41J 2/2117
See application file for complete search history.

(56) References Cited

U.S. PATENT DOCUMENTS

| 9,855,764 | B2* | 1/2018 | Yamamoto | B41J 2/2114 |
| 2008/0119359 | A1* | 5/2008 | Utagawa | B41M 5/305 503/201 |
| 2016/0023480 | A1* | 1/2016 | Heath | B41J 11/0015 347/16 |
| 2016/0144630 | A1* | 5/2016 | Yamamoto | B41J 2/2114 347/21 |
| 2016/0307078 | A1* | 10/2016 | Akazawa | G06K 15/1823 |
| 2016/0347081 | A1* | 12/2016 | Fukasawa | B41J 2/16579 |
| 2018/0086113 | A1* | 3/2018 | Oya | B41J 11/0015 |

FOREIGN PATENT DOCUMENTS

| JP | 2002-038063 A | 2/2002 |
| JP | 2013-010364 A | 1/2013 |
| JP | 5754537 B2 | 7/2015 |

* cited by examiner

*Primary Examiner* — Scott A Richmond
(74) *Attorney, Agent, or Firm* — Keating & Bennett, LLP

(57) ABSTRACT

A printer includes a clear ink tank, a color ink tank, a clear ink injection head, a color ink injection head, a light source, and a controller. The controller includes a matte printing controller structured or programmed to cause clear ink to be injected from the clear ink injection head and to be irradiated by the light source to form a matte clear ink layer on a recording medium; and a color printing controller structured or programmed to cause color ink to be injected from the color ink injection head to form a color ink layer on the clear ink layer.

13 Claims, 6 Drawing Sheets

INKJET PRINTER AND INKJET PRINTING METHOD

CROSS REFERENCE TO RELATED APPLICATIONS

This application claims the benefit of priority to Japanese Patent Application No. 2016-216180 filed on Nov. 4, 2016. The entire contents of this application are hereby incorporated herein by reference.

BACKGROUND OF THE INVENTION

1. Field of the Invention

The present invention relates to an inkjet printer using photocurable ink and an inkjet printing method.

2. Description of the Related Art

Conventionally, a photocurable-type inkjet printer using photocurable ink to print an image or the like on a recording medium is known. This type of printer includes an inkjet head injecting photocurable ink toward the recording medium, and an irradiation device irradiating the recording medium with light. The photocurable ink injected from the inkjet head arrives at the recording medium. The photocurable ink on the recording medium is irradiated with light from the irradiation device. As a result, the photocurable ink is cured and adheres to the recording medium.

Recently, there have been a diversity of recording mediums usable for such a photocurable-type inkjet printer. Even a transparent recording medium such as, for example, a glass medium, a resin film or the like is used. However, in the case where a color image is directly printed on such a transparent recording medium, the color tone of the image may be unclear because the recording medium acting as an underlying layer has too high a light transmittance, in other words, the recording medium does not have a sufficient level of light blocking property. Therefore, in general, before a color image is printed, an achromatic ink layer is formed on a surface of the recording medium by use of achromatic ink to improve the light blocking property of a surface on which the printing is to be performed. For example, according to a conventional method shown in FIG. 6, white ink is used to form a white ink layer 50W on a surface of a recording medium. 50 to improve the light blocking property of a surface on which the printing is to be performed. Then, process color ink is printed on the white ink layer 50W to form a process color ink layer 50P, so that a color image having a clear color tone is realized (see Japanese Laid-Open Patent Publication No. 2013-010364).

SUMMARY OF THE INVENTION

However, according to the studies made by the present inventors, with the above-described technology, the light blocking property of the white ink layer 50W is significantly influenced by the concentration of a white colorant in the white ink. Therefore, it is difficult for a user to adjust the light transmittance and the light blocking property of the white ink layer 50W. For example, in order to improve the light transmittance of the white ink layer 50W, it is needed to use white ink containing a white colorant at a concentration lower than usual to decrease the amount of the white colorant per unit area size of the white ink layer 50W. By contrast, in order to improve the light blocking property of the white ink layer 50W, it is needed to use white ink containing a white colorant at a concentration higher than usual or to print white ink a plurality of times to increase the amount of the white colorant per unit area size of the white ink layer 50W. For these reasons, an adjustment of the light transmittance or the light blocking property of the white ink layer 50W requires more time and labor or more cost because it is necessary to prepare a plurality of types of white ink having different concentrations of the white colorant, or requires an extended time to form the white ink layer 50W. Such requirements impose a burden on a user. In such a situation, an inkjet printer capable of adjusting the light transmittance or the light blocking property of a surface on which printing is to be performed with a novel conception has been desired.

Preferred embodiments of the present invention provide photocurable-type inkjet printers capable of flexibly adjusting the light transmittance or the light blocking property of a surface on which printing is to be performed by a technique different from a conventional technique.

An inkjet printer according to a preferred embodiment of the present invention includes a clear ink tank that stores photocurable clear ink; a color ink tank that stores photocurable color ink; a clear ink injection head in communication with the clear ink tank, the clear ink injection head injecting the clear ink toward a recording medium; a color ink injection head in communication with the color ink tank, the color ink injection head injecting the color ink toward the recording medium; a light source that irradiates the recording medium with light; and a controller. The controller includes a matte printing controller structured or programmed to cause the clear ink to be injected from the clear ink injection head and to be irradiated by the light source to form a matte clear ink layer on the recording medium; and a color printing controller structured or programmed to cause the color ink to be injected from the color ink injection head to form a color ink layer on the clear ink layer.

The inkjet printer having the above-described structure forms the matte clear ink layer by use of the clear ink on the recording medium before performing printing by use of the color ink. The matte clear ink layer refracts and scatters light incident thereon. Therefore, the inkjet printer having the above-described structure varies the light transmittance or the light blocking property of a surface on the printing is to be performed because of the effect provided by the refraction and scattering of light. For example, when the degree of light refraction by the clear ink layer is increased, the light transmittance of the surface on which the printing is to be performed is decreased. This increases the visual recognizability of the printed color image. As a result, the color tone of the printed color image is made clear. In the case where the degree of light refraction by the clear ink layer is varied, a wider diversity of representations is realized as compared with a conventional case where the underlying layer is the white ink layer. Thus, the degree of freedom of design is improved.

In another preferred embodiment of the present invention, an inkjet printing method is provided. The inkjet printing method includes the steps of preparing a recording medium; providing photocurable clear ink on the recording medium and irradiating the clear ink with light to form a matte clear ink layer; and providing photocurable color ink on the clear ink layer and irradiating the color ink with light to form a color ink layer.

In this specification, the term "clear ink" typically refers to colorless, transparent ink containing no colorant (compound absorbing light in a visible light region). It should be noted that the clear ink may contain a small amount (e.g., 0.1% by mass or less of the entirety of the ink) of colorant and may be slightly colored, for example, slightly reddish or bluish.

The inkjet printers and the inkjet printing methods according to preferred embodiments of the present invention may vary the degree of light refraction by the clear layer to flexibly adjust the light transmittance or the light blocking property of a surface on which printing is to be performed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments according to the present invention will be described with reference to the drawings. The preferred embodiments do not limit the present invention in any way. Components or sites having the same function will bear the same reference signs, and overlapping descriptions will be omitted or simplified when necessary.

Figure 1:
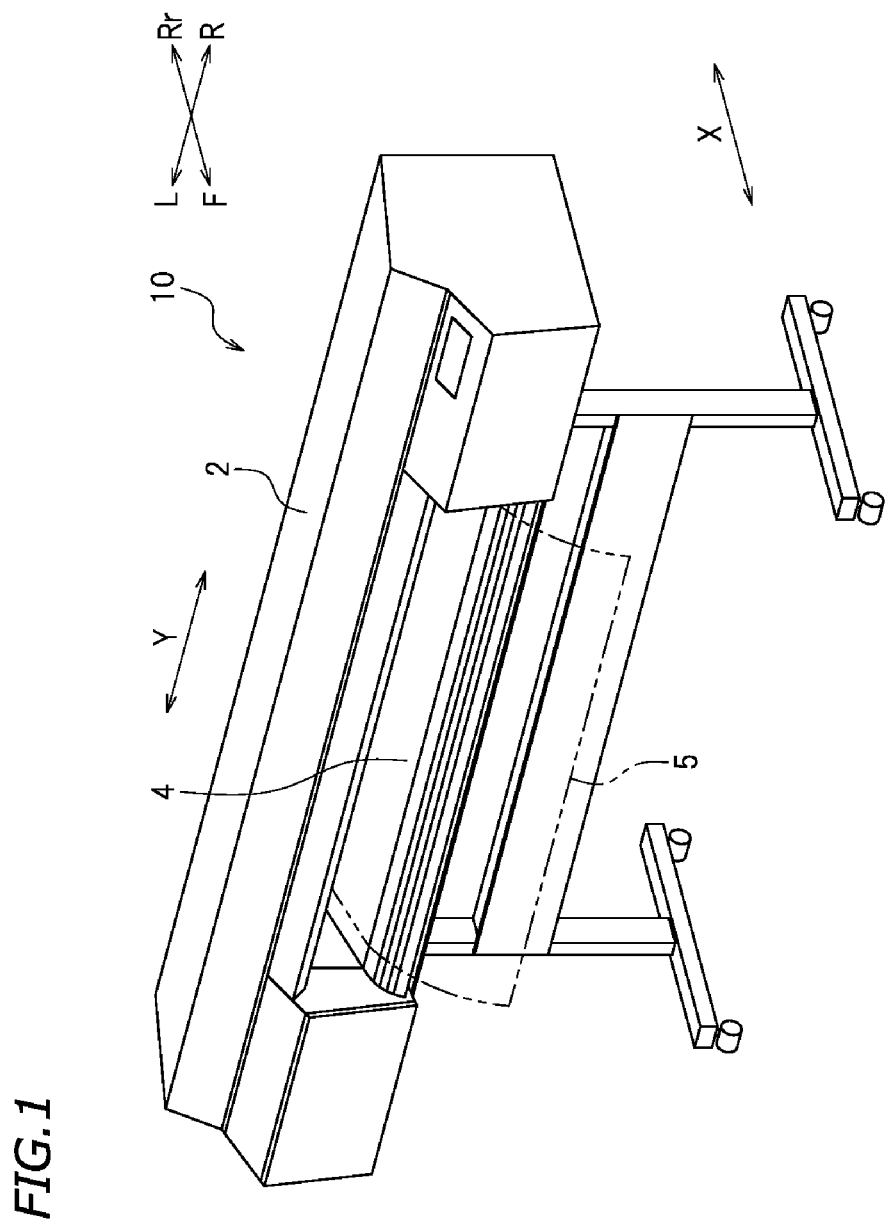
FIG. 1 is a perspective view of an inkjet printer according to a preferred embodiment of the present invention.
Figure 2:
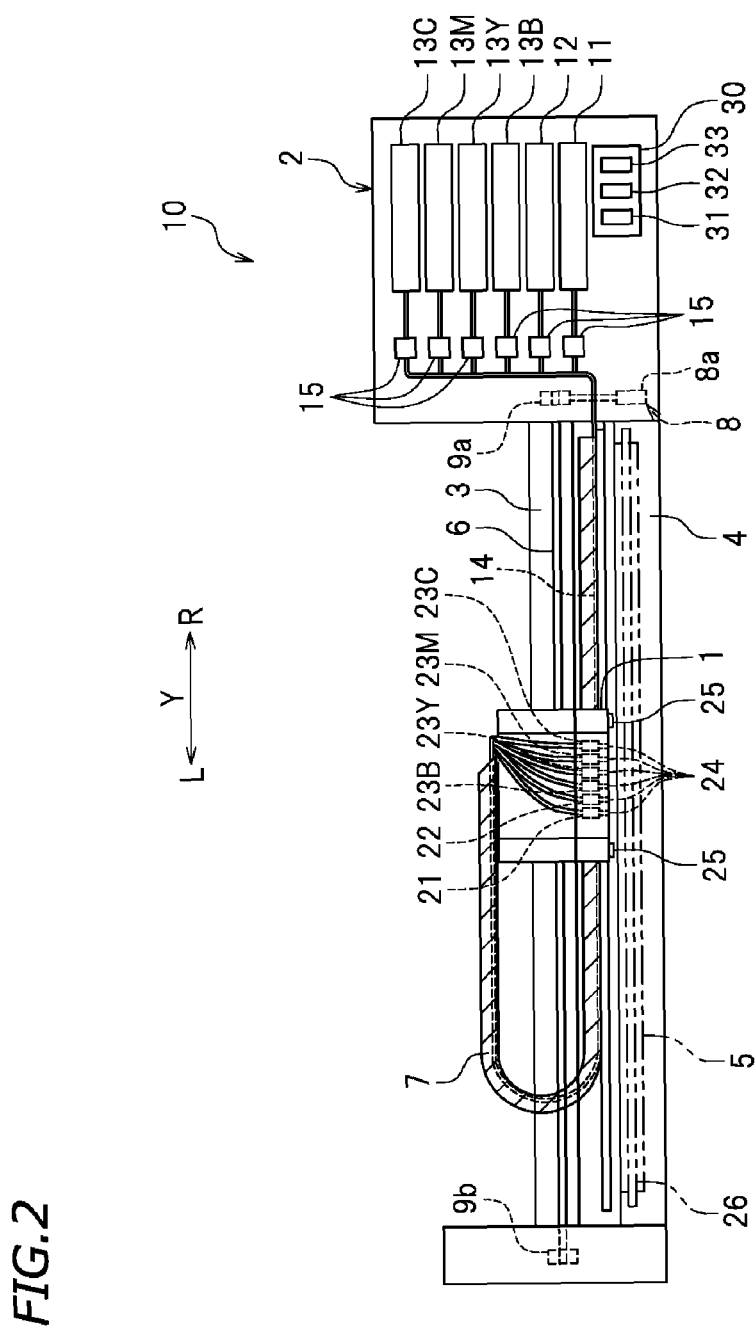
FIG. 2 is a front view of a main portion of the inkjet printer shown in FIG. 1.

First, an inkjet printer 10 will be described. FIG. 1 is a perspective view of a large inkjet printer (hereinafter, may be referred to simply as a "printer") according to a preferred embodiment of the present invention. FIG. 2 is a front view showing a main portion of the printer 10. In the drawings, letter X represents a sub scanning direction and a front-rear direction. In the drawings, letters F and Rr respectively represent "front" and "rear". In the drawings, letter Y represents a main scanning direction and a left-right direction. In the drawings, letters L and R respectively represent "left" and "right". These directions are defined merely for the sake of convenience, and do not limit the manner of installation of the printer 10 in any way.

The printer 10 is a photocurable-type printer usable to print an image on a recording medium 5. The recording medium 5 is a target on which an image is to be printed. There is no specific limitation on the recording medium 5. The recording medium 5 may be, for example, a transparent sheet or film, or an opaque sheet or film. In this specification, the term "transparent" indicates that the visible light transmittance is 60% or higher, for example. The "visible light" is light having a wavelength of 380 nm to 780 nm, for example. The "visible light transmittance" is the ratio of the intensity of the transmitted light with respect to the intensity of the incident light that is represented by percentage. The visible light transmittance may be obtained in conformity to, for example, JIS A5759 (2008) defined by the Japanese Industrial standards.

The material of the transparent sheet or film may be, for example, polyester-based resin such as polyethyleneterephthalate (PET) resin, polyethylenenaphthalate (PEN) resin or the like; polyolefin-based resin such as polyethylene (PE) resin, polypropylene (PP) resin, ethylene-propylene copolymer or the like; polyether-based resin such as polyurethane resin or the like; polycarbonate (PC)-based resin; polyimide-based resin; polyamide-based resin; resin such as fluorine-based resin or the like; glass; composite containing a plurality of these materials; etc. The material of the opaque sheet or film may be, for example, paper such as plain paper, inkjet printing paper, or the like; a metal material such as aluminum, iron, copper or the like; rubber; composite paper such as vapor-deposited paper, coated paper, art paper, coated paper coated with a certain amount of compound or polymer, cast paper, matte paper, gloss paper or the like; etc.

Specifically in the case where a transparent sheet or film is used as the recording medium 5, the effect of the printer 10 disclosed herein is well exhibited. As described above, in the case where a surface on which printing is to be performed is transparent, the color tone of the printed color image may be unclear. The printer 10 forms a clear ink layer 5M (see FIG. 4A) before printing a desired image with colors. As a result, the color development property of the color image printed on the clear ink layer 5M is improved because of the effect provided by refraction and scattering of light. Thus, the color clarity is increased. In the case where the recording medium 5 is a transparent sheet or film having a visible light transmittance of 70% or higher, especially 80% or higher, the above-described problem is easily caused. Therefore, the effect of the printer 10 is especially well exhibited in the case where the recording medium 5 is such a transparent sheet or film.

The printer 10 includes a casing 2 and a guide rail 3 provided in the casing 2. The guide rail 3 extends in the left-right direction, and is secured to left and right walls of the casing 2. The guide rail 3 is in engagement with a carriage 1. The carriage includes injection heads 21, 22, 23C, 23M, 23Y and 23B, and ultraviolet lamps 25. The carriage 1 is slidable in the main scanning direction Y (left-right direction in FIG. 1) along the guide rail by a carriage moving mechanism 8. The carriage moving mechanism 8 includes pulleys 9b and 9a located at a left end and a right end of the guide rail 3. The pulley 9a located at the right end is coupled with a carriage motor 8a. The pulley 9a is driven by the carriage motor 8a. An endless belt 6 extends along, and between, the pulleys 9a and 9b. The carriage 1 is secured to the belt 6. When the pulley 9a and 9b are rotated and thus the belt 6 runs, the carriage 1 moves in the main scanning direction Y.

The recording medium 5 is transported in a paper feeding direction by a paper feeding mechanism (not shown). In this example, the paper feeding direction is the sub scanning direction X (front-rear direction in FIG. 1). A platen 4 supporting the recording medium 5 is provided in the casing 2. The platen 4 is provided below the carriage 1. A pinch roller (not shown) pressing the recording medium 5 from above is provided above the platen 4. A grit roller (not shown) is provided below the pinch roller. The grit roller is coupled with a feed motor (not shown). The grit roller is driven to rotate by the feed motor. When the grit roller is rotated in a state where the recording medium 5 is held between the grit roller and the pinch roller, the recording medium 5 is transported in the sub scanning direction X.

At a right end of the casing 2, six cartridges 11, 12, 13C, 13M, 13Y and 13B are detachably attached. Among these cartridges, the cartridge 11 is an example of clear ink supply source storing clear ink. The cartridges 12, 13C, 13M, 13Y and 13B are each an example of color ink supply source storing color ink. In more detail, the cartridge 12 is an example of achromatic ink supply source storing achromatic color ink. In this example, the cartridge 12 stores white ink. The other four cartridges 13C, 13M, 13Y and 13B are each an example of chromatic ink supply source storing process color ink. The process color ink stored in the cartridges 13C, 13M, 13Y and 13B is prepared so as to print images of different colors. Specifically, the cartridge 13C stores cyan ink. The cartridge 13M stores magenta ink. The cartridge 13Y stores yellow ink. The cartridge 13B stores black ink.

In this specification, the term "color ink" refers to ink of any color other than the clear ink, and encompasses general process color ink and also, for example, metallic ink and the like. In this specification, the term "achromatic" refers to a color having a chroma of 0 (excluding black), specifically, white and gray. In this specification, the term "chromatic" refers to a color having a chroma of more than 0, specifically, any color other than white and gray.

The clear ink, the achromatic color ink and the process color ink stored in the cartridges 11, 12, 13C, 13M, 13Y and 13B are all ink having a property of being cured when receiving light, namely, photocurable ink. There is no specific limitation on such ink, and any ink equivalent to conventionally used ink is usable. For example, the ink may be solvent-free UV ink, eco-solvent-based UV ink, real solvent-based UV ink or the like. In a typical preferred embodiment, each type of ink contains a photopolymerizable monomer and a photoinitiator, and may optionally contain any other additive, for example, a photosensitizer, a polymerization inhibitor, a scavenger, an antioxidant, a UV absorber, a plasticizer, a surfactant, a leveling agent, a thickener, a dispersant, a defoaming agent, a preservative, a solvent or the like. Color ink, namely, achromatic color ink and chromatic color ink (process color ink) may typically contain a colorant. Chromatic color ink may contain an inorganic additive such as, for example, a metallic pigment or the like.

The ink stored in each of the cartridges 11, 12, 13C, 13M, 13Y and 13B may be adjusted to have a viscosity of generally 0.5 to 50 cps, more preferably 1 to 20 cps, for example. In order to provide the clear ink layer 5M in a favorable matte state, it is preferred that the viscosity of the clear ink is higher than the viscosity of the color ink. It should be noted that the viscosity of the clear ink may be lower than, or equivalent to, the viscosity of the color ink. In this specification, the term "viscosity" refers to a value measured in conformity to JIS 28803 (2001) defined by the Japanese Industrial Standards, at a temperature 25° C. by use of a cone plate-type rotatable viscometer.

The ink stored in each of the cartridges 11, 12, 13C, 13M, 13Y and 13B may be adjusted to have a surface tension of 10 mN/m to 50 mN/m, for example. With such an arrangement, the ink is suppressed from staying in the printer 10. As a result, the ink is injected stably from the injection heads 21, 22, 23C, 23M, 23Y and 23B. In order to provide the clear ink layer 5M in a favorable matte state, it is preferred that the surface tension of the clear ink is higher than the surface tension of the color ink. It should be noted that the surface tension of the clear ink may be lower than, or equivalent to, the surface tension of the color ink. In this specification, the term "surface tension" refers to a value measured at a temperature of 20° C. by use of a surface tension meter of a plating method (Wilhelmy plate method) and by use of a platinum plate as a gauge head.

In this preferred embodiment, the clear ink supply source is one cartridge 11. The clear ink supply source is not limited to this. The clear ink supply source may include two or more cartridges. In this preferred embodiment, the achromatic ink supply source is one cartridge 12. The achromatic ink supply source is not limited to this. The achromatic ink supply source may include two or more cartridges, for example, a white ink supply source and a gray ink supply source. In this preferred embodiment, the chromatic ink supply source includes four cartridges 13C, 13M, 13Y and 13B. The chromatic ink supply source is not limited to this. The chromatic ink supply source may include one cartridge or, for example, five or more cartridges. In other words, the printer 10 may perform monochromatic printing or spot color ink printing such as metallic printing or the like.

The carriage 1 of the printer 10 includes the six injection heads 21, 22, 23C, 23M, 23Y and 23B. The injection heads 21, 22, 23C, 23M, 23Y and 23B are arrayed in a line in the main scanning direction Y. Among these injection heads, the injection head 21 is an example of clear ink injection head. The injection heads 22, 23C, 23M, 23Y and 23B are each an example of color ink injection head. In more detail, the injection head 22 is an example of achromatic ink injection head. The other four injection heads 23C, 23M, 23Y and 23B are each an example of chromatic ink injection head. The injection head 21 is in communication with the cartridge 11 via an ink supply path 14. The injection head 22 is in communication with the cartridge 12 via an ink supply path 14. The injection heads 23C, 23M, 23Y and 23B are respectively in communication with the cartridges 13C, 13M, 13Y and 13B via ink supply paths 14. The six injection heads 21, 22, 23C, 23M, 23Y and 23B may be integrally formed as in this preferred embodiment; or at least one of, or all of, the injection heads 21, 22, 23C, 23M, 23Y and 23B may be formed separately.

The injection heads 21, 22, 23C, 23M, 23Y and 23B each have a nozzle 24, through which the ink is injected, at a surface facing the recording medium 5 (in this preferred embodiment, at a bottom surface). In each of the injection heads 21, 22, 23C, 23M, 23Y and 23B, an actuator (not shown) including a piezoelectric element is provided. The actuator is driven, and thus the ink is injected from the nozzle of each of the injection heads 21, 22, 23C, 23M, 23Y and 23B toward the recording medium 5. For example, the clear ink is injected from the injection head 21. The white ink is injected from the injection head 22. The process color ink is injected from the injection heads 23C, 23M, 23Y and 23B.

The ink supply paths 14 are flow paths usable to supply the ink from the cartridges 11, 12, 13C, 13M, 13Y and 13B to the injection heads 21, 22, 23C, 23M, 23Y and 23B. The ink supply paths 14 are each, for example, a flexible tube. The injection heads 21, 22, 23C, 23M, 23Y and 23B are mounted on the carriage 1, and move in the main scanning direction Y. By contrast, the cartridges 11, 12, 13C, 13M, 13Y and 13B are not mounted on the carriage 1, and do not move in the main scanning direction Y. Therefore, the ink supply paths 14 are partially located as extending in the left-right direction and covered with a cable protection and guide device 7, so as not to be broken when the carriage 1 moves in the main scanning direction Y. In this preferred embodiment, the ink supply paths 14 are each provided with a supply pump 15. The supply pump 15 is not absolutely necessary, and may be omitted.

A heater 26 is provided in a front portion of the platen 4. The heater 26 heats the recording medium 5 to promote the curing of the ink arriving at the recording medium 5. Use of the heater 26 allows the ink on the recording medium 5 to be cured quickly. The heater 26 is not absolutely necessary, and may be omitted.

The ultraviolet lamps 25 are mounted on the carriage 1, and irradiate the recording medium 5 with light while moving in the main scanning direction Y. In this preferred embodiment, one ultraviolet lamp 35 is provided at each of left and right ends of the injection heads 21, 22, 23C, 23M, 23Y and 23B. This realizes bidirectional printing, which increases the printing speed. The ultraviolet lamps 25 is each an example of light source. Ultraviolet light from each ultraviolet lamp 25 may have an ultraviolet wavelength capable of curing the photocurable ink. The ultraviolet lamp 25 may be of, for example, an LED system, a fluorescent light (low-pressure mercury lamp) system, or a high-pressure mercury lamp system. In this example, there are two ultraviolet lamps 25. Alternatively, one ultraviolet lamp 25 may be provided, or three or more ultraviolet lamps 25 may be provided. Such an ultraviolet lamp 25 may be, for example, directly secured to a wall of the carriage 1 or indirectly secured to the wall of the carriage 1 via another member such as a coupling tool or the like. The ultraviolet lamp 25 may be mounted on, for example, another carriage different from the carriage 1, or may be provided on a wall or the like of the casing 2.

The overall operation of the printer 10 is controlled by a controller 30. The controller 30 is communicably connected with the carriage motor 8a of the carriage moving mechanism 8, the feed motor of the paper feeding mechanism, the injection heads 21, 22, 23C, 23M, 23Y and 23B, and the ultraviolet lamps 25, and is structured or programmed to control these components. The controller 30 preferably includes three, namely, first through third, printing controllers 31, 32, 33, for example. The first printing controller 31 is structured or programmed to form the matte clear ink layer 5M on the recording medium 5, for example, on a surface of the recording medium 5. The second printing controller 32 is structured or programmed to form a white ink layer 5W (see FIG. 4A) on the clear ink layer 5M, for example, on a surface of the clear ink layer 5M. The third printing controller 33 is structured or programmed to form a process color ink layer 5P (see FIG. 4A) on the clear ink layer 5M, for example, on the surface of the clear ink layer 5M, or on a surface of the white ink layer 5W. The controller 30 may be a circuit having a function equivalent to the above. In this case, the first through third printing controllers 31, 32 and 33 may be replaced with first through third printing control circuits 31, 32 and 33.

There is no specific limitation on the structure of the controller 30. The controller 30 is typically a computer. The controller 30 includes, for example, an interface (I/F) receiving printing data or the like from an external device such as a host computer or the like, a central processing unit (CPU) executing a command of a control program, a ROM storing the program to be executed by the CPU, a RAM usable as a working area in which the program is developed, and a storage device (storage medium) such as a memory or the like storing the various types of data.

In this preferred embodiment, a color ink tank includes the cartridge 12 storing the achromatic color ink (white ink) and the cartridges 13C, 13M, 13Y and 13B storing chromatic color ink. A color ink injection head includes the injection head 22, which is in communication with the cartridge 12 and injects white ink, and the injection heads 23C, 23M, 23Y and 23B, which are in communication with the cartridges 13C, 13M, 13Y and 13B and inject chromatic color ink. A color printing controller includes the second printing controller 32, which is structured or programmed to have the injection head 22 inject the white ink and to form the white ink layer 5W on the clear ink layer 5M, and the third printing controller 33, which is structured or programmed to have the injection heads 23C, 23M, 23Y and 23B inject the process color ink and to form the process color ink layer 5P on the white ink layer 5W. With such an arrangement, for example, printing of only the clear ink layer 5M, printing of only the white ink layer 5W, and printing of the clear ink layer 5M and the white ink layer 5W in combination may be performed to form an underlying layer for the process color ink layer 5P. Thus, the printed color image has a variety of color tones, and the degree of freedom of design is improved.

In this preferred embodiment, the first printing controller 31 may be structured or programmed to form the clear ink layer 5M such that the clear ink layer 5M has a 60° gloss lower than that of the recording medium 5, for example. Alternatively, the first printing controller 31 may be structured or programmed to form the clear ink layer 5M such that the clear ink layer 5M has a 60° gloss higher than that of the white ink layer 5W and/or the process color ink layer 5P, for example. The first printing controller 31 may be structured or programmed to form the clear ink layer 5M such that the clear ink layer 5M has a 60° gloss of 50 or less, for example.

In this preferred embodiment, the first printing controller 31 may be structured or programmed to form the clear ink layer 5M such that the clear ink layer 5M has a larger thickness variance than that of the white ink layer 5W and/or the process color ink layer 5P. Alternatively, the first printing controller 31 may be structured or programmed to form the clear ink layer 5M such that the clear ink layer 5M includes at least one of a portion having a thickness exceeding 1.5 times the average thickness of the clear ink layer 5M and a portion having a thickness less than 0.5 times the average thickness of the clear ink layer 5M, for example.

In this preferred embodiment, the recording medium 5 may be transparent, in other words, may have a visible light transmittance of 60% or higher, for example. The recording medium 5 may have a visible light transmittance of 70% or higher, for example. In the case where the recording medium 5 having such a visible light transmittance is used, the effect of the printer 10 is better exhibited.

Figure 3:
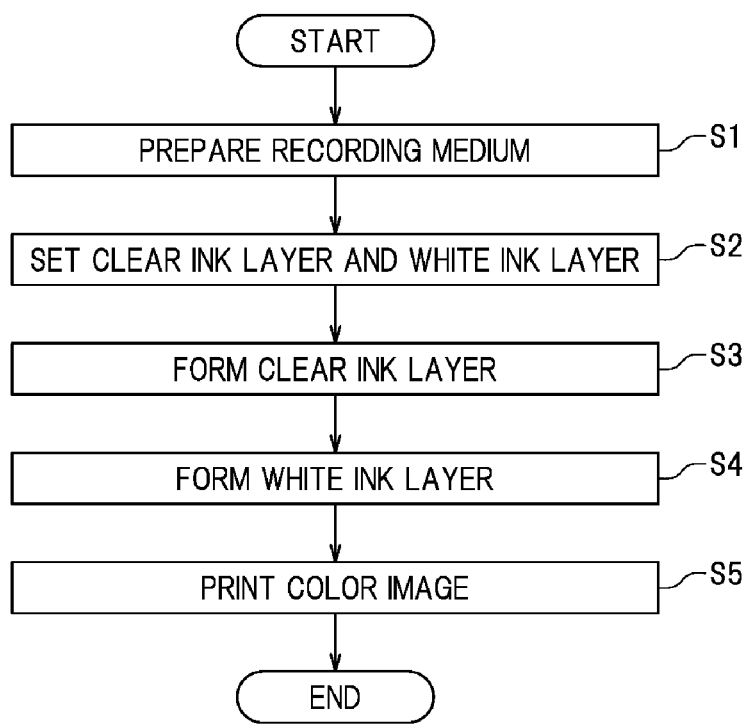
FIG. 3 is a flowchart of an inkjet printing method according to a preferred embodiment of the present invention.
Figure 4A:
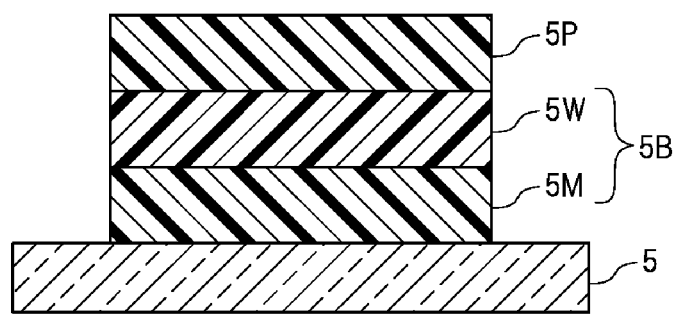
FIG. 4A is a schematic view showing a cross-section of a printed color image according to a preferred embodiment of the present invention.

Now, an inkjet printing method using the printer 10 will be described. FIG. 3 is a flowchart of the inkjet printing method according to a preferred embodiment of the present invention. FIG. 4A is a schematic cross-sectional view showing a printed color image provided by the inkjet printing method shown in FIG. 3. Before the printing is performed by the printer 10, data for the color image to be printed is input to the controller 30. The data for the color image to be printed includes information on, for example, the printing position, color, gloss or the like of the image. The information on the color is represented by, for example, the RGB value or the 256 gray scale of the CMYK color space. The information on the gloss is represented by, for example, the reflection coefficient.

First, in step S1, a user prepares the recording medium 5, and sets the recording medium 5 in the printer 10. When the feed motor of the paper feeding mechanism is driven in this state, the recording medium 5 is transported in the sub scanning direction X and is located at a predetermined printing start position.

Next, in step S2, the user sets, in the controller 30, a printing region of a printing underlying layer 5B, which is to be located between the recording medium 5 and the printed color image, and conditions for forming the printing underlying layer 5B. In this preferred embodiment, the printing underlying layer 5B has a two-layer structure including the clear ink layer 5M and the white ink layer 5W. The printing region of the printing underlying layer 5B may be arbitrarily set for each of the layers included in the printing underlying layer 5B. The settings on the printing of the clear ink layer 5M are output to the first printing controller 31. The settings on the printing of the white ink layer 5W are output to the second printing controller 32.

The printing region of each of the clear ink layer 5M and the white ink layer 5W may be set for, for example, the entirety of the recording medium 5 or may be set for, for example, only a position where the color image is to be printed. In an example, first, an outline of a pattern included in the input data on the color image to be printed is detected. Then, a region larger than the region enclosed by the outline is set as the printing region of each of the clear ink layer 5M and the white ink layer 5W.

The conditions for forming the printing underlying layer 5B may be arbitrarily set for each of the layers included in the printing underlying layer 5B. The thickness at which the printing underlying layer 5B is to be formed may be adjusted by the injection amount of the ink. The clear ink layer 5M may be formed to be relatively thick by injecting a relatively large amount of ink. With such an arrangement, the degree of refraction of the light is increased, and the printing underlying layer 5B is realized to have a relatively low light transmittance, in other words, to have a high light blocking property. The clear ink layer 5M may be formed to be relatively thin by injecting a relatively small amount of ink. With such an arrangement, the degree of refraction of the light is decreased, and the printing underlying layer 5B is realized to have a relatively high light transmittance, in other words, to have a low light blocking property. The clear ink layer 5M may be thicker than, as thick as, or thinner than, the white ink layer 5W or the process color ink layer 5P.

In order to provide the clear ink layer 5M in a favorable matte state, it is preferred that the dot density (ratio of pixels in which dots are formed in a certain region (unit pixel number)) is decreased such that the dots do not much contact each other. Namely, it is preferred that the dots are discrete from each other. From the point of view of increasing the effect of light refraction, it is preferred that the dot density of the clear ink layer 5M is lower than the dot density of the white ink layer 5W. It should be noted that the dot density of the clear ink layer 5M may be higher than, or equal to, the dot density of the white ink layer 5W.

In the case where the injection head 21 is structured to inject different sizes of dots by being controlled by the actuator or the like, it is preferred to vary the dot size such that the clear ink layer 5M has a convex and concave pattern. With such an arrangement, the clear ink layer 5M is provided in a favorable matte state, and the effect of light refraction is further improved. The dots may be located regularly or irregularly. In the case where, for example, the dot size is varied regularly, the clear ink layer 5M has a pattern such as an emboss-like pattern, a fabric texture-like pattern, a leather texture-like pattern or the like. The clear ink layer 5M may be formed with a pattern such as letters, numerical figures, symbols, decorative items, motifs or the like. The arrangements of the dots may be changed in this manner, so that the printed color image is provided with any of various designs.

Next, in step S3, the first printing controller 31 automatically forms the clear ink layer 5M in a matte state on a surface of the recording medium 5 based on the settings on the printing of the clear ink layer 5M. In more detail, the first printing controller 31 drives the carriage moving mechanism 8 to move the carriage 1 in the main scanning direction Y while causing the clear ink stored in the cartridge 11 to be injected from the injection head 21 and to arrive at the recording medium 5. The first printing controller 31 drives the ultraviolet lamps 25 to irradiate the clear ink that has arrived at the recording medium 5 with light. In this manner, the clear ink is cured and thus the clear ink layer 5M adheres to the surface of the recording medium 5.

The time duration from the injection of the clear ink until the irradiation of the clear ink by the ultraviolet lamps 25 may be arbitrarily set. For example, in order to provide the clear ink layer 5M in a favorable matte state, the time duration from the injection of the clear ink until the irradiation of the clear ink by the ultraviolet lamps 25 may be set to be relatively short. With such an arrangement, the dots are suppressed from contacting each other, or the size of the convex and concave portions at the surface of the clear ink layer 5M (thickness variance) is increased, and thus the effect of light refraction by the clear ink layer 5M is further improved.

The clear ink layer 5M formed by the first printing controller 31 is matte. In this specification, the term "matte" refers to a state where the surface is suppressed from being glossy. The degree at which the clear ink layer 5M is matte may be adjusted by, for example, the composition or properties of the clear ink, the dot density or the arrangement of the dots of the clear ink layer 5M, the time duration from the injection of the clear ink until the irradiation of the clear ink by the ultraviolet lamps 25, or the like.

In a preferred embodiment of the present invention, the 60° gloss of the clear ink layer 5M is generally 50 or less, typically 40 or less, for example, 30 or less. With such an arrangement, the effect of light refraction is provided preferably. From the point of view of improving the effect of light refraction, the 60° gloss of the clear ink layer 5M may be lower than the 60° gloss of the recording medium 5. The 60° gloss of the clear ink layer 5M may be higher than, or lower than, the 60° gloss of the white ink layer 5W. In this specification, the term "60° gloss" is a value measured in conformity to JIS 28741 (1997) defined by the Japanese Industrial Standards by use of a gloss meter. As the degree of being matte is higher, the gloss is lower.

In another preferred embodiment of the present invention, the thickness of the clear ink layer 5M is non-uniform, in other words, is not uniform. In this specification, the expression that "the thickness is uniform" indicates that the thickness variance is small. For example, the thickness of the clear ink layer 5M is measured at a plurality of arbitrary points (e.g., 10 points). In the case where the thickness at each point is within ±25% of the arithmetic mean of the thicknesses at the plurality of points (average thickness), the thickness is considered to be uniform. The expression that "the thickness is non-uniform" indicates that the thickness variance is large. For example, in the case where the above-described plurality of points include a point at which the thickness is more than +25% of the average thickness or a point at which the thickness is less than −25% of the average thickness, the thickness is considered to be non-uniform. From the point of view of improving the effect of light refraction, the clear ink layer 5M may include a portion having a thickness exceeding 150% of the average thickness or a portion having a thickness less than 50% of the average thickness. For example, a point at which the thickness is largest and a point at which the thickness is smallest, among the above-described plurality of points, may have a difference that is 200% or higher of the average thickness. The thickness variance of the clear ink layer 5M may be larger than, or smaller than, the thickness variance of the white ink layer 5W.

Next, in step S4, the second printing controller 32 automatically forms the white ink layer 5W on the surface of the clear ink layer 5M based on the settings on the printing of the white ink layer 5W. In more detail, the second printing controller 32 drives the carriage moving mechanism 8 to move the carriage 1 in the main scanning direction Y while causing the white ink stored in the cartridge 12 to be injected from the injection head 22 and to arrive at the surface of the clear ink layer 5M. The second printing controller 32 drives the ultraviolet lamps 25 to irradiate the arrived white ink with light. In this manner, the white ink is cured and thus the white ink layer 5W adheres to the surface of the clear ink layer 5M.

Next, in step S5, the third printing controller 33 automatically prints an image on the surface of the white ink layer 5W based on the color image to be printed. In more detail, the third printing controller 33 drives the carriage moving mechanism 8 to move the carriage 1 in the main scanning direction Y while causing the process color ink stored in the cartridges 13C, 13M, 13Y and 13B to be injected from the injection heads 23C, 23M, 23Y and 23B and to arrive at the surface of the white ink layer 5W. The third printing controller 33 drives the ultraviolet lamps 25 to irradiate the arrived process color ink with light. In this manner, the process color ink is cured and thus the process color ink layer 5P adheres to the surface of the white ink layer 5W.

As shown in FIG. 4A, the printed color image provided by the inkjet printing method shown in FIG. 3 includes the matte clear ink layer 5M, the white ink layer 5W and the process color ink layer 5P sequentially from the side of the recording medium 5. In this example, the clear ink layer 5M, the white ink layer 5W form the printing underlying layer 5B.

Figure 4B:
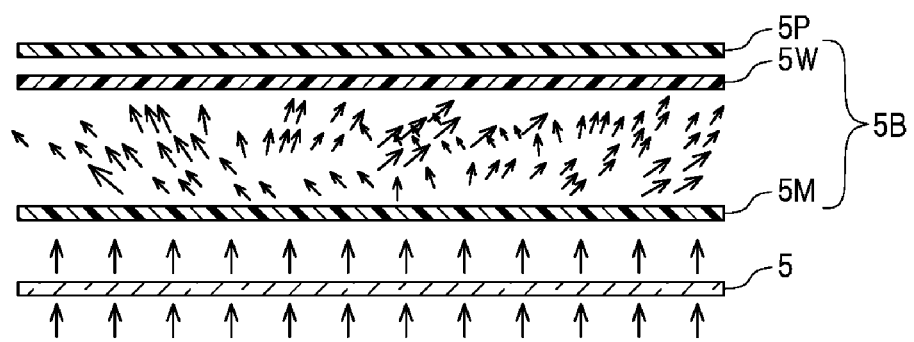
FIG. 4B shows a function of a clear ink layer.

FIG. 4B shows a function of the clear ink layer 5M. As shown in FIG. 4B, the clear ink layer 5M acts as so-called "frosted glass" to provide an effect of preventing straight transmission of light. In general, light advances straight. Therefore, in the case where the recording medium 5 is transparent, light incident on the recording medium 5 from the opposite side to the process color ink layer 5P is mostly transmitted straight toward the clear ink layer 5M. However, with the technology disclosed herein, the clear ink layer 5M is formed in a matte state. Therefore, the light that is transmitted straight through the recording medium 5 is refracted or scattered by the clear ink layer 5M. As a result, the amount of light transmitted from the clear ink layer 5M toward the printed color image is decreased, and the light transmittance of the surface at which the process color ink layer 5P is formed is decreased. This increases the visual recognizability of the process color ink layer 5P, namely, the printed color image. As a result, the color tone of the printed color image is made clear. In the case where the degree of light refraction by the clear ink layer 5M is varied, a variety of light blocking property levels is provided, and thus the degree of freedom of design or representation is improved.

In this preferred embodiment, the step of forming the color ink layer may include a first step of providing the white ink on the clear ink layer 5M and irradiating the white ink with light to form the white ink layer 5W, and a second step of providing the process color ink on the white ink layer 5W and irradiating the process color ink with light to form the process color ink layer 5P.

In this preferred embodiment, the recording medium 5 may be transparent, in other words, may have a visible light transmittance of 60% or higher, for example. The recording medium 5 may have a visible light transmittance of 70% or higher, for example.

So far, preferred embodiments of the present invention have been described. The above-described preferred embodiments are merely examples, and the present invention may be carried out in any of various other forms.

In the above-described preferred embodiments, the printed color image includes one matte clear ink layer 5M, one white ink layer 5W and one process color ink layer 5P on the recording medium 5. The printed color image is not limited to this. For example, each of the layers 5M, 5W and 5P may include two or more layers. Alternatively, another layer may be provided between the layers 5M, 5W and 5P. Another layer may be provided on a surface of the process color ink layer 5P. The layer that may be provided on the surface of the process color ink layer 5P may be, for example, an overcoat layer, specifically, a gloss layer formed by curing gloss ink usable to provide the surface with a glossy appearance.

Figure 5A:
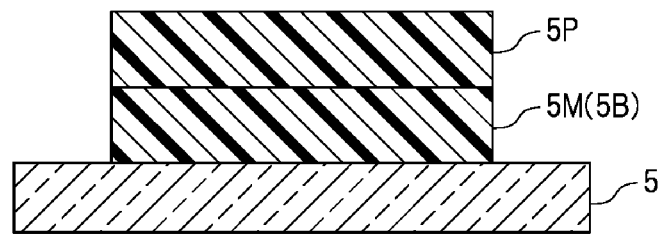
FIG. 5A through FIG. 5C are each a schematic cross-sectional view showing another example of printed color image.
Figure 5B:
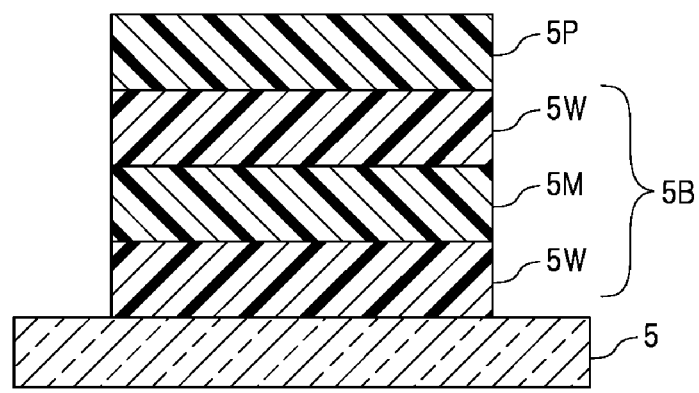
Figure 5C:
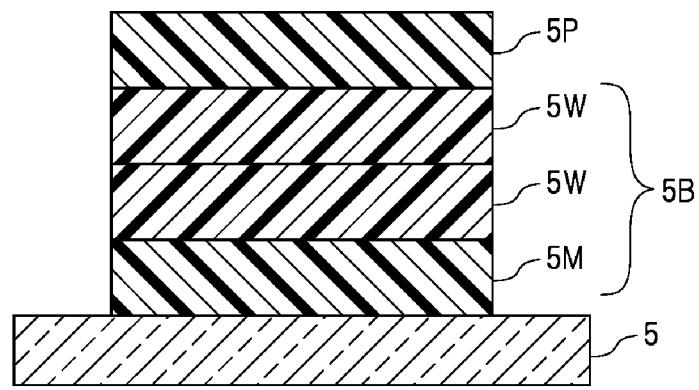
Figure 6:
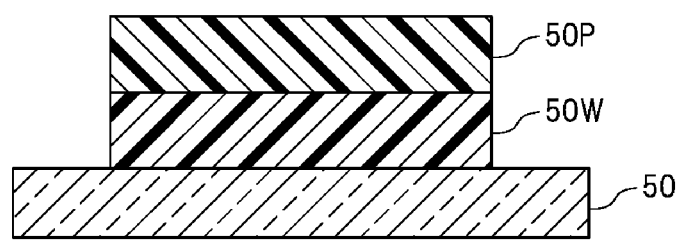
FIG. 6 is a schematic view showing a conventional printed color image.

FIG. 5A through FIG. 5C are each a schematic cross-sectional view showing another example of printed color image. The printed color image in FIG. 5A includes the matte clear ink layer 5M and the process color ink layer 5P on the surface of the recording medium 5. The printed color image in FIG. 5A does not include the white ink layer 5W between the clear ink layer 5M and the process color ink layer 5P. In other words, the printing underlying layer 5B is formed of only the clear ink layer 5M. As can be seen, the printing underlying layer 5B does not need to include the white ink layer 5W. The printed color image in FIG. 5B includes the matte clear ink layer 5M, two white ink layers 5W and the process color ink layer 5P on the surface of the recording medium 5. The printed color image in FIG. 5B includes the clear ink layer 5M between the two white ink layers 5W. As can be seen, an additional white ink layer 5W may be provided between the recording medium 5 and the clear ink layer 5M. The printed color image in FIG. 5C includes the matte clear ink layer 5M, two white ink layers 5W and the process color ink layer 5P on the surface of the recording medium 5. The printed color image in FIG. 5C includes the two white ink layers 5W on the surface of the clear ink layer 5M. As can be seen, two or more white ink layers 5W may be stacked continuously.

With the printing method shown in FIG. 3, the user sets the conditions for forming the printing underlying layer 5B in the controller 30. The printing method is not limited to this. The controller 30 may be structured or programmed to automatically set the conditions for forming the printing underlying layer 5B in accordance with the type of the recording medium 5. The controller 30 may be structured or programmed to automatically set, step by step or continuously, the degree at which the clear ink layer 5M is matte. In this case, the controller 30 may be structured or programmed to set the degree at which the clear ink layer 5M is matte to be higher as the recording medium 5 to be used is more transparent. In a specific preferred embodiment, first, the user selects the recording medium 5, and the type of the recording medium 5 is input to the controller 30. The controller 30 has, stored thereon, the types of the recording medium 5 and the visible light transmittances in association with each other in the form of a correspondence table or the like. In accordance with the type of the recording medium 5 to be used, the controller 30 determines the degree at which the clear ink layer 5M is matte. For example, in the case where a second recording medium that is more transparent than a first recording medium is used, the controller 30 sets the degree at which the clear ink layer 5M is matte to a second degree that is higher than a first degree.

In the preferred embodiment shown in FIG. 1 and the like, the printer 10 does not include a sensor that measures the light transmittance of the recording medium 5. The printer 10 may include a sensor that measures the light transmittance of the recording medium 5. With such an arrangement, the light transmittance of the recording medium 5 is accurately grasped. This allows the clear ink layer 5M to be formed in an optimal matte state in accordance with the light transmittance of the recording medium 5.

In the preferred embodiment shown in FIG. 1 and the like, the printer 10 does not include an ink circulation path.

Alternatively, an ink circulation path may be optionally provided between the cartridges 11, 12, 13C, 13M, 13Y and 13B and the injection heads 21, 22, 23C, 23M, 23Y and 23B, so as to allow the ink to circulate in the printer 10. Especially the white ink tends to have a white colorant be precipitated easily. Therefore, it is preferred to, for example, provide an ink circulation path between the cartridge 12 and the injection head 22.

The printer 10 in the preferred embodiment shown in FIG. 1 and the like is a so-called shuttle-type (serial-type) printer, in which the injection heads 21, 22, 23C, 23M, 23Y and 23B are mounted on the carriage 1, and the printing is performed while the carriage 1 is reciprocally moved (shuttle-moved) in the main scanning direction Y perpendicular to the paper feeding direction of the recording medium 5. The printer 10 is not limited to this. The technology disclosed herein is also applicable to, for example, a so-called line-type printer, which includes a line head having the same width as that of the recording medium 5 and performs printing in a state where the line head is secured.

The injection heads 21, 22, 23C, 23M, 23Y and 23B and the recording medium 5 move relatively to each other. Either the injection heads 21, 22, 23C, 23M, 23Y and 23B or the recording medium 5 may move in the main scanning direction Y or in the sub scanning direction X. For example, the recording medium 5 may be located to be unmovable, and the injection heads 21, 22, 23C, 23M, 23Y and 23B may move both in the main scanning direction Y and in the sub scanning direction X. Alternatively, both of the injection heads 21, 22, 23C, 23M, 23Y and 23B and the recording medium 5 may move in both of the directions. The technology disclosed herein is applicable to the printer 10, described above in the preferred embodiments, of a so-called roll-to-roll type, which transports the recording medium 5, and is also applicable to, for example, a flat bed type printer.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer, comprising:
a clear ink tank that stores photocurable clear ink;
a color ink tank that stores photocurable color ink;
a clear ink injection head in communication with the clear ink tank, the clear ink injection head injecting the clear ink toward a recording medium;
a color ink injection head in communication with the color ink tank, the color ink injection head injecting the color ink toward the recording medium;
a light source that irradiates the recording medium with light; and
a controller communicably connected with the clear ink injection head, the color ink injection head and the light source; wherein
the controller is structured or programmed to include:
a matte printing controller structured or programmed to cause the clear ink to be injected from the clear ink injection head and to be irradiated by the light source to form a matte clear ink layer on the recording medium; and
a color printing controller structured or programmed to cause the color ink to be injected from the color ink injection head to form a color ink layer on the clear ink layer;
the color ink tank includes:
an achromatic ink tank that stores achromatic color ink; and
a chromatic ink tank that stores chromatic color ink;
the color ink injection head includes:
an achromatic ink injection head in communication with the achromatic ink tank, the achromatic ink injection head injecting the achromatic color ink; and
a chromatic ink injection head in communication with the chromatic ink tank, the chromatic ink injection head injecting the chromatic color ink; and
the color printing controller is structured or programmed to include:
an achromatic printing controller structured or programmed to cause the achromatic color ink to be injected from the achromatic ink injection head to form an achromatic ink layer on the clear ink layer; and
a chromatic printing controller structured or programmed to cause the chromatic color ink to be injected from the chromatic ink injection head to form a chromatic ink layer on the achromatic ink layer.

2. The inkjet printer according to claim 1, wherein the color ink tank includes an achromatic ink tank that stores achromatic color ink.

3. The inkjet printer according to claim 1, wherein the matte printing controller is structured or programmed to form the clear ink layer such that the clear ink layer has a 60° gloss lower than a 60° gloss of the recording medium, the 60° gloss being based on JIS Z8741 (1997) defined by the Japanese Industrial Standards.

4. The inkjet printer according to claim 1, wherein the matte printing controller is structured or programmed to form the clear ink layer such that the clear ink layer has a 60° gloss higher than a 60° gloss of the color ink layer, the 60° gloss being based on JIS Z8741 (1997) defined by the Japanese Industrial Standards.

5. The inkjet printer according to claim 1, wherein the matte printing controller is structured or programmed to form the clear ink layer such that the clear ink layer has a 60° gloss of 50 or less, the 60° gloss being based on JIS Z8741 (1997) defined by the Japanese Industrial Standards.

6. The inkjet printer according to claim 1, wherein the matte printing controller is structured or programmed to form the clear ink layer such that the clear ink layer has a thickness variance larger than a thickness variance of the color ink layer.

7. The inkjet printer according to claim 1, wherein the matte printing controller is structured or programmed to form the clear ink layer such that the clear ink layer includes at least one of a portion having a thickness 1.5 times an average thickness of the clear ink layer and a portion having a thickness less than 0.5 times the average thickness of the clear ink layer.

8. The inkjet printer according to claim 1, wherein the recording medium is transparent.

9. The inkjet printer according to claim 8, wherein the recording medium has a visible light transmittance of 70% or higher, the visible light transmittance being based on JIS A5759 (2008) defined by the Japanese Industrial Standards.

10. An inkjet printing method, comprising the steps of:
    preparing a recording medium;
    providing photocurable clear ink on the recording medium and irradiating the clear ink with light to form a matte clear ink layer; and
    providing photocurable achromatic color ink on the clear ink layer and irradiating the achromatic color ink with light to form an achromatic color ink layer; and
    providing photocurable chromatic color ink on the achromatic ink layer and irradiating the chromatic color ink with light to form a chromatic ink layer.

11. The inkjet printing method according to claim 10, wherein a transparent recording medium is used as the recording medium.

12. The inkjet printing method according to claim 11, wherein a recording medium having a visible light transmittance of 70% or higher is used as the recording medium, the visible light transmittance being based on JIS A5759 (2008) defined by the Japanese Industrial Standards.

13. An inkjet printer, comprising:
    a clear ink tank that stores photocurable clear ink;
    a color ink tank that stores photocurable color ink;
    a clear ink injection head in communication with the clear ink tank, the clear ink injection head injecting the clear ink toward a recording medium;
    a color ink injection head in communication with the color ink tank, the color ink injection head injecting the color ink toward the recording medium;
    a light source that irradiates the recording medium with light; and
    a controller communicably connected with the clear ink injection head, the color ink injection head and the light source; wherein
    the controller is structured or programmed to include:
        a matte printing controller structured or programmed to cause the clear ink to be injected from the clear ink injection head and to be irradiated by the light source to form a matte clear ink layer on the recording medium; and
        a color printing controller structured or programmed to cause the color ink to be injected from the color ink injection head to form a color ink layer on the clear ink layer; and
    the matte printing controller is structured or programmed to form the clear ink layer such that the clear ink layer has a thickness variance larger than a thickness variance of the color ink layer, or the matte printing controller is structured or programmed to form the clear ink layer such that the clear ink layer includes at least one of a portion having a thickness 1.5 times an average thickness of the clear ink layer and a portion having a thickness less than 0.5 times the average thickness of the clear ink layer.

* * * * *